United States Patent
Azrieli et al.

(10) Patent No.: US 10,067,971 B2
(45) Date of Patent: *Sep. 4, 2018

(54) TRACKING MODEL ELEMENT CHANGES USING CHANGE LOGS

(71) Applicant: International Business Machines Corporation, Armonk, NY (US)

(72) Inventors: Ilya Azrieli, Rehovot (IL); Eldad Palachi, Beer Yaakov (IL); Yura Zharkovsky, Rehovot (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,683

(22) Filed: Apr. 5, 2016

(65) Prior Publication Data
US 2016/0217172 A1 Jul. 28, 2016

Related U.S. Application Data

(63) Continuation of application No. 14/570,598, filed on Dec. 15, 2014, now Pat. No. 9,329,859.

(51) Int. Cl.
*G06F 17/30* (2006.01)
*G06F 8/71* (2018.01)
*G06F 8/35* (2018.01)

(52) U.S. Cl.
CPC .......... *G06F 17/30368* (2013.01); *G06F 8/35* (2013.01); *G06F 8/71* (2013.01); *G06F 17/30371* (2013.01); *G06F 17/30525* (2013.01); *G06F 17/30598* (2013.01)

(58) Field of Classification Search
CPC ........ G06F 17/30368; G06F 8/71; G06F 8/35; G06F 17/30371
USPC ......................................................... 717/104
See application file for complete search history.

(56) References Cited

U.S. PATENT DOCUMENTS

| 7,562,056 | B2 | | 7/2009 | Ma et al. | |
|---|---|---|---|---|---|
| 8,667,381 | B1 | * | 3/2014 | Feng | G06F 8/34 715/211 |
| 9,329,859 | B1 | | 5/2016 | Azrieli et al. | |
| 9,569,479 | B2 | | 2/2017 | Azrieli et al. | |
| 2007/0006130 | A1 | | 1/2007 | Stamler et al. | |
| 2007/0277151 | A1 | * | 11/2007 | Brunel | G06F 8/10 717/113 |
| 2010/0250779 | A1 | * | 9/2010 | B'Far | G06F 21/10 709/246 |

(Continued)

OTHER PUBLICATIONS

Egyed, A., "UML/Analyzer: A Tool for the Instant Consistency Checking of UML Models", Software Engineering, 2007. ICSE 2007. 29th International Conference on, May 20-26, 2007, pp. 793-796.

(Continued)

*Primary Examiner* — Anna Deng
(74) *Attorney, Agent, or Firm* — Cuenot, Forsythe & Kim, LLC

(57) ABSTRACT

Examples of techniques for processing model changes are described herein. A method includes generating, via a processor, a change log in a model. The method also includes detecting, via the processor, a change to a model element of a model package in the model. The method further includes storing, via the processor, the detected change as a change item in a topic of the change log.

18 Claims, 5 Drawing Sheets

(56) References Cited

U.S. PATENT DOCUMENTS

| | | |
|---|---|---|
| 2010/0313179 A1 | 12/2010 | Groves et al. |
| 2012/0265582 A1* | 10/2012 | Kuester ................. G06Q 10/06 705/7.37 |
| 2013/0005488 A1* | 1/2013 | Evans ..................... A63F 13/71 463/43 |
| 2013/0080350 A1 | 3/2013 | Bhola et al. |
| 2016/0171038 A1 | 6/2016 | Azrieli et al. |

OTHER PUBLICATIONS

Koegel, M. et al., "Comparing State- and Operation-Based Change Tracking on Models", Enterprise Distributed Object Computing Conference (EDOC), 2010 14th IEEE International, Oct. 25-29, 2010, pp. 163-172.

Grace Period Disclosure: Palachi, E. et al., "CRS-1543, Rafael and IBM Rational Collaboration: Track changes for MBSE With IBM Rational Rhapsody," Jun. 1-5, 2014, 38 pg.

IBM: List of IBM Patents or Patent Applications Treated as Related, 2 pg.

Azrieli, I. et al., "Tracking Model Element Changes Using Change Logs," U.S. Appl. No. 14/570,598, filed Dec. 15, 2014, 30 pages (A copy is not provided as this application is available to the Examiner.

Azrieli, I. et al., "Tracking Model Element Changes Using Change Logs", U.S. Appl. No. 14/925,071, filed Oct. 28, 2015, 30 pages (A copy is not provided as this application is available to the Examiner.

* cited by examiner

TRACKING MODEL ELEMENT CHANGES USING CHANGE LOGS

STATEMENT REGARDING PRIOR DISCLOSURES BY THE INVENTOR OR A JOINT INVENTOR

The following disclosure(s) are submitted under 35 U.S.C. 102(b)(1)(A):

CRS-1543, Rafael and IBM Rational Collaboration: Track Changes for MBSE With IBM Rational Rhapsody, by Eldad Palachi and Yaron Levi (June 2014).

BACKGROUND

The present techniques relate to models, and more specifically, to tracking changes to model elements.

SUMMARY

According to an embodiment described herein, a system can include a processor to monitor a model element of a model package in a model. The processor can also generate a change log in the model for storing changes to the model element. The processor can further detect a change to the model element. The processor can also further tag the detected change as a main change or a derived change based on previously detected changes. The processor can also store the detected change as a main change or a derived change in a topic of the change log.

According to another embodiment described herein, a computer program product for tracking changes to model elements can include a computer-readable storage medium having code embodied therewith. The computer readable storage medium is not a transitory signal per se. The program code is also executable by a processor to cause the processor to monitor, via the processor, a model element of a model package in a model. The program code can also cause the processor to generate, via the processor, a change log in the model to organize changes to the model element. The program code can also further cause the processor to detect, via the processor, a change to the model element of the model package. The program code can also cause the processor to generate, via the processor a change item in a topic of the change log, the change item corresponding to the detected change.

According to another embodiment described herein, a method can include generating, via a processor, a change log in the model. The method can also include detecting, via the processor, a change to a model element of a model package in a model. The method can further include storing, via the processor, the detected change as a change item in a topic of the change log.

DETAILED DESCRIPTION

Visual modeling languages, such as a Unified Modeling Language™ (UML®), among others, are used to describe complex systems that can include both software and hardware. Such complex systems may include aircraft, vehicles, or automotive systems, and the like. A UML®-based language model (also referred to herein as a model) can include a model package with a plurality of elements that can be displayed based on a selected view of the model. For example, UML®-based languages include SysML and UPDM, among others. A model package as used herein refers to a collection of model elements that express various engineering abstractions associated with a system's structure and/or behavior. Alternatively, or in addition, the model package can include information about the engineering artifacts related to the system. For example, engineering artifacts can include requirements, planning, testing, external documents, etc. Model elements can refer to these abstractions or engineering artifacts. For example, model packages can be used to organize model elements according to various characteristics of the model elements. For example, a systems engineering model can include electrical engineering, mechanical engineering, and software engineering views or schematics of the same model elements. A change to model elements in a model package by a software engineer, for example, can produce effects on other model elements to be worked on by different engineers.

According to embodiments of the present disclosure, a change log can be generated inside a UML®-based model and used to track changes in the model elements of a model package in the model. In some examples, changes to model elements (also referred to herein as elements) can be arranged in the change log as change items that are tagged as main changes or derived changes. A change item can be defined in a tracking changes profile and corresponds to a change made to a specific model element. In some examples, the change items can be organized by topic. For example, changes made during a time period or for a purpose can be included in a separate topic. Thus, embodiments of the present disclosure enable changes to complex systems as applied to elements in a model to be tracked and organized effectively for visual analysis. Furthermore, the organized changes can be queried or analyzed using modeling language tools.

Figure 1:
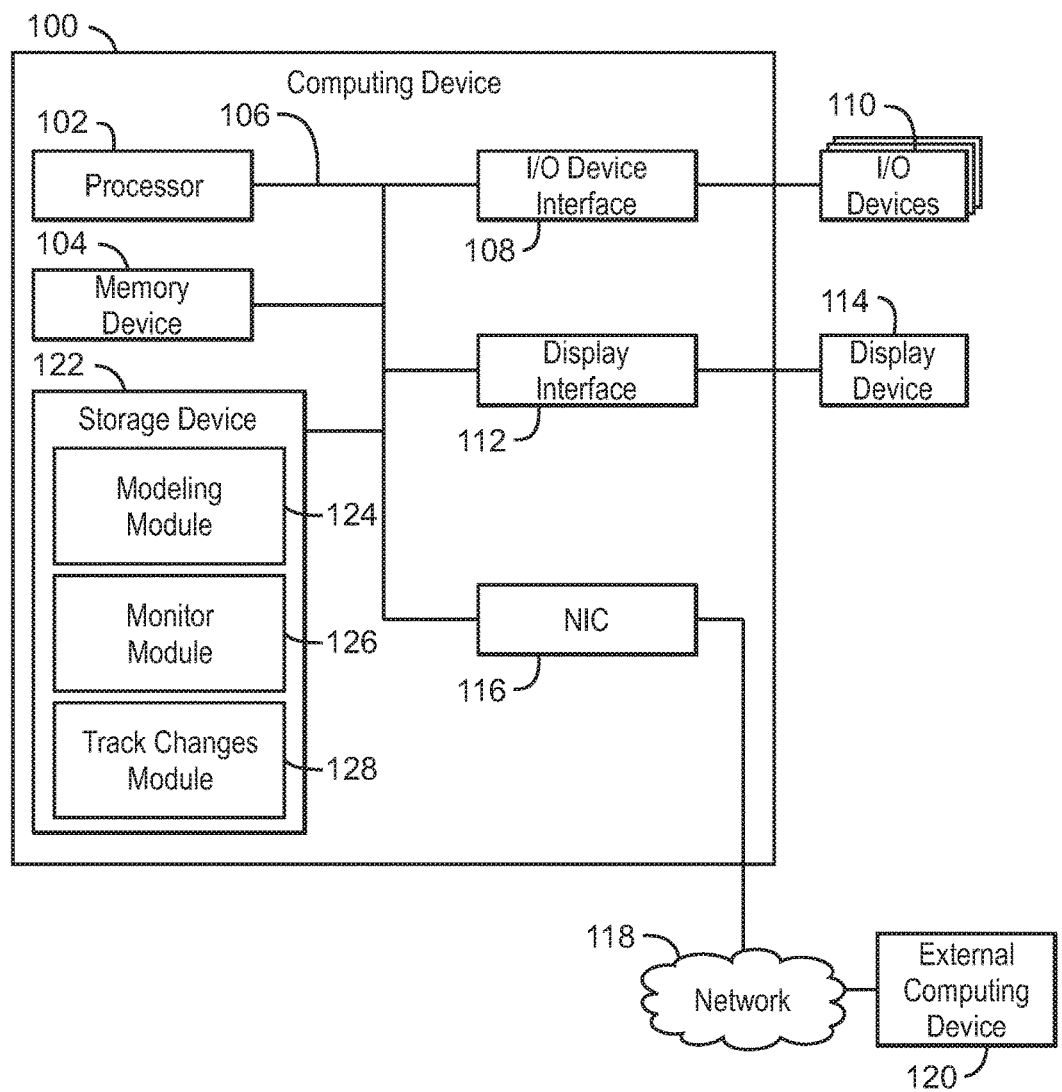
FIG. 1 is block diagram of an example computing device that can track changes to model elements.

With reference now to FIG. 1, an example computing device is depicted that can track changes to model elements. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. An external computing device 120 may connect to the computing device 100 through the network 118. In some examples, external computing device 120 may be an external webserver 120. In some examples, external computing device 120 may be a cloud computing node.

The processor 102 may also be linked through the system interconnect 106 to a storage device 122 that can include a hard drive, an optical drive, a USB flash drive, an array of drives, or any combinations thereof. In some examples, the storage device may include a modeling module 124, a monitor module 126, and a track changes module 128. The modeling module 124 can generate a change log package (also referred to herein as a change log) in a model for tracking changes to model elements in a model package. For example, the model can be written in a UML®-based language, among other modeling languages. A change log, as referred to herein, can include any suitable data structure, such as a container, an array, a vector, a linked list, and the like, that can store any number of changes to any number of model elements in a model. In some examples, the change log is defined by a tracking changes profile. The monitor module 126 can monitor changes in the model elements of the model package. For example, the monitor module 126 can be a plugin for the modeling module 124 that can be turned off or on via a user interface. The monitor module 126 can send detected changes to the track changes module 128 for further processing.

In implementations, the track changes module 128 can detect changes to the model elements and generate change items corresponding to the detected changes and insert the corresponding change items into one or more model packages. In some examples, the change items can include main change items (also referred as main changes) and derived change items (also referred to as derived changes). One or more derived changes can be associated with a main change. In some examples, the change items can be grouped into change topic packages, also referred to herein as change topics. Change items can be stored to an active change topic. An active change topic refers to a model package that receives change items are they are generated based on detected changes. In some examples, the track changes module 128 can present the change items in a table with types of changes represented by color.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the modeling module 124, monitor module 126, and track changes module 128 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the modeling module 124, the monitor module 126, and the track changes module 128, can be implemented with logic, wherein the logic, as referred to herein, can include any suitable hardware (e.g., a processor, among others), software (e.g., an application, among others), firmware, or any suitable combination of hardware, software, and firmware.

Figure 2:
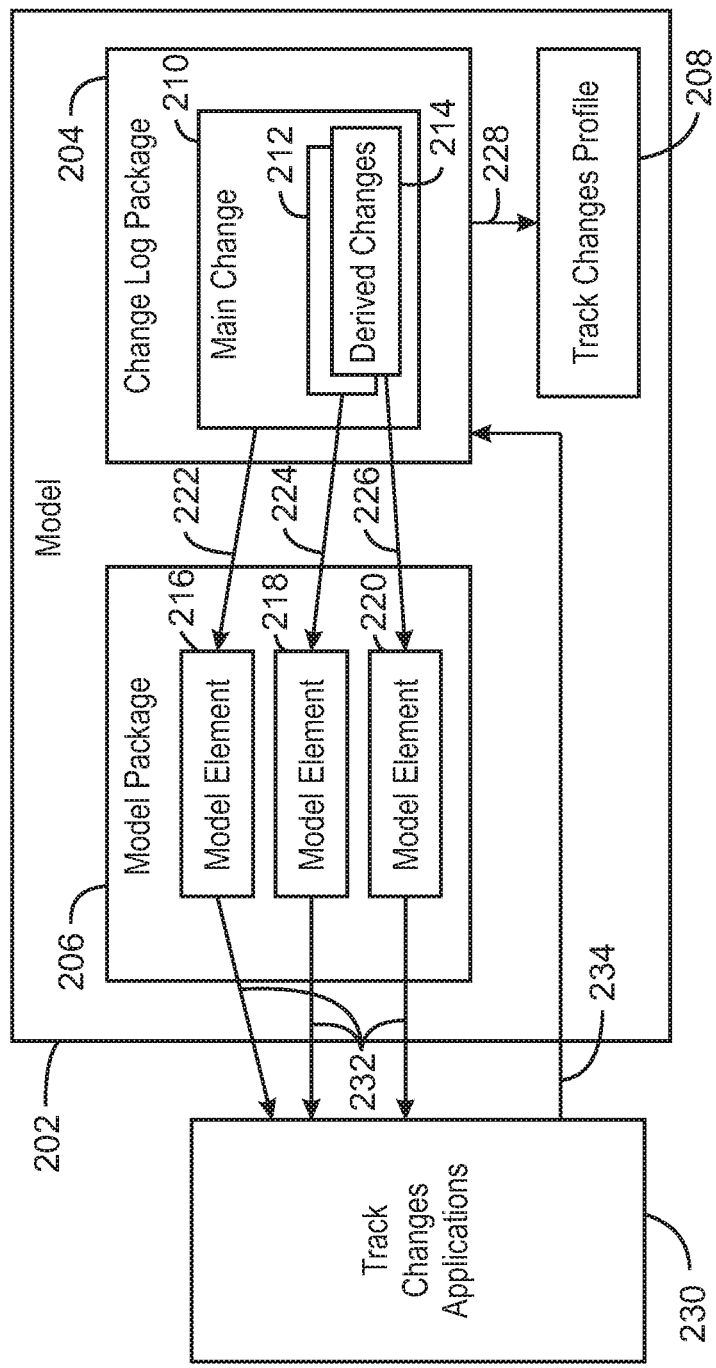
FIG. 2 is a block diagram of an example system for tracking changes to model elements.

FIG. 2 is a block diagram of an example storage device for tracking changes to model elements. The example storage device of FIG. 2 is generally referred to by the reference number 200.

As shown in FIG. 2, the example storage device 200 includes model 202. The model 202 includes a change log package 204, also referred to herein as a change log 204, a model package 206, and a track changes profile 208. The change log 204 includes a main change 210 and a pair of derived changes 212, 214. A main change 210 is a change item corresponding to a detected change that may have occurred prior to and/or caused one or more detected changes represented in the change log as derived changes. The model package 206 contains model elements 216, 218, 220. For example, the model elements may be files representing interconnected parts of a system. The main change 210 is associated with the model element 216 as indicated by pointer 222. The derived change 212 is associated with the model element 218 as indicated by a pointer 224. The derived change 214 is associated with the model element 220 as indicated by a pointer 226. The change log 204 is communicatively coupled to the track changes profile as indicated by an arrow 228. The example storage device 200 also includes a track change application that is communicatively coupled to the model package 206 as indicated by the arrows 232.

In implementations, the model 202 can be a model based on a modeling language that is configured by a modeling application. For example, the modeling application may configure models based on languages such as the Unified Modeling Language™ (UML®), among others. The model package 206 can include the model elements 216, 218, 220 of a particular system being modeled. In some embodiments, the model elements may be edited by a user. For example, model element 216 may have its name changed from A to A1. In some examples, the tracking changes application 230 monitors model elements 216, 218, 220 for any changes and detects changes to the model elements as indicated by the arrows 232. The tracking changes application 230 can store the detected changes to model elements 216, 218, and 220 as main changes 210 or derived changes 212, 214. In the example illustrated in FIG. 2, the tracking changes application 230 detects three changes corresponding to the model elements 216, 218, 220. For example, the tracking changes application 230 can detect the rename of element 216 and resulting changes in model elements 216 and 218. For example, model elements 216, 218 can represent diagrams showing model element 216, an association end itsA, the package that owns A and all the package owners up to the model root, a property, part, or argument typed by A, a hyperlink pointing to A, and/or a reference to the association end itsA. In some examples, the tracking changes application 230 can tag the change to model element 216 as a main change 210 and tag the changes to model elements 210, and 220 as derived changes 212, 214 and store the main change 210 and derived changes 212, and 214 in a change log package 204 of the model 202. For example, the derived changes 212, 214 can include results from changing model element 216 name from A to A1, such as changes to any the diagrams showing block A, the rename of the association end itsA to itsA1, the package that owns A and now owns A1 and all the package owners up to the model root, all properties/parts/arguments typed by A, all hyperlinks pointing to A, all references to the association end itsA.

In some implementations, the track change profile 208 can define stereotypes for the model 202. A stereotype, as used herein, refers to a UML extensibility mechanism that allows the vocabulary of UML® to be extended in order to create new model elements derived from existing elements, and like mechanisms in other UML®-based languages. UML® vocabulary as used herein is a collection of meta-classes describing abstractions of engineering elements such as classes, methods, state machines, events, actions, etc., and their relationships and features. For example, UML® vocabulary can include the name of an element, its multiplicity/cardinality if applicable, its type if applicable, etc. For example, the tracking changes profile 208 can include a change item stereotype, a change topic stereotype, and a change log stereotype as discussed in greater detail with reference to FIG. 3 below. In some examples, the track changes application 230 can use the stereotypes defined in the track changes profile 208 to group the detected changes into change items inside of topics of the change log package 204 as described below with reference to FIG. 3.

It is to be understood that the block diagram of FIG. 2 is not intended to indicate that the example storage device 200 is to include all of the components shown in FIG. 2. Rather, the example storage device 200 can include fewer or additional components not illustrated in FIG. 2 (e.g., additional modules, additional model packages, additional models, etc.).

Figure 3:
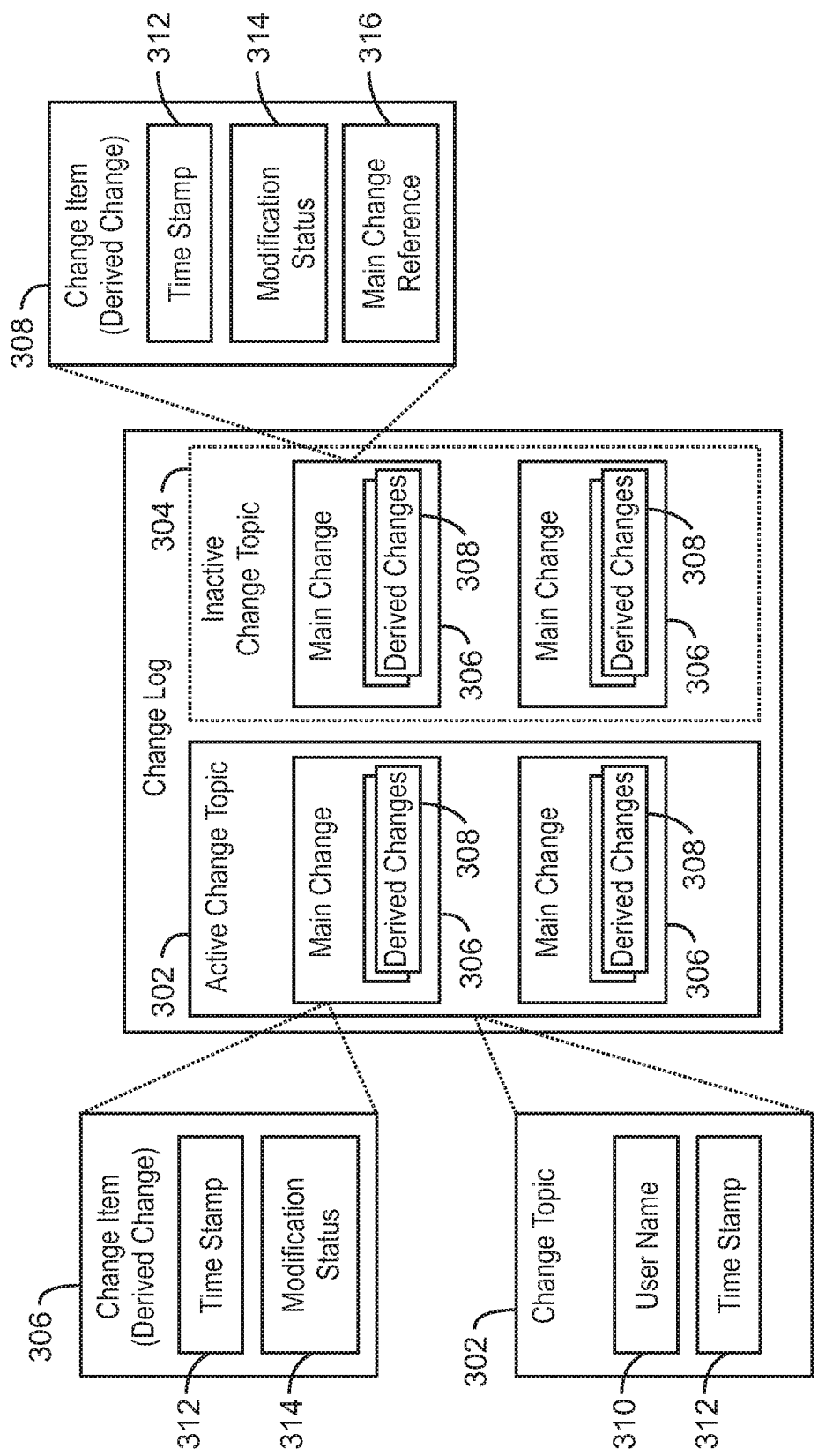
FIG. 3 is a block diagram of an example change log that can be used to track changes to model elements.

FIG. 3 is a block diagram of an example change log that can be used to track changes to model elements. The example change log of FIG. 3 is generally referred to by the reference number 300. In FIG. 3, the change log 300 includes an active change topic 302 and an inactive change topic 304. The change log 300 also includes change items 306 tagged as main changes. The change log 300 also contains change items 308 tagged as derived changes 308. Each change topic can include a user name tag 310 and a time stamp tag 312. Furthermore, each main change 306 can contain a time stamp tag 312 and a modification status tag 314. Each derived change 308 can also have a main change reference tag 316 in addition to a time stamp 312 and a modification status tag 314.

As discussed above, the tracking changes profile can include three stereotypes for organizing the detected changes: change log stereotype, a change topic stereotype, and a change item stereotype. A change log 300, as used herein, is a model package that includes one or more change topics 302, and 304. For example, the change log can be a data structure such as a container including one or more change topics stored as containers within the change log container. In some examples, the change topic 302 can include a user name tag 310 to specify the name of the author of a topic as a tagged value. A tag, as used herein, refers to an extension mechanism of UML® or any other modeling language extension mechanism that allows one or more properties to be specified in connection with a model element. In some examples, the change topic 302 can include a time stamp 312 to specify the date and time that the change topic 302 was last created and/or last edited. For example, the time stamp 312 can be used to select an active change topic 302 when the track changes application is started by comparing time stamps 312 of a plurality of topics 302, 304 and setting a recently edited change topic as an active change topic 302. Any changes made to a model element of a model package can be represented as a change item 306, and 308 in the active change topic 302. In some examples, a user may create a new active change topic 302 and subsequent changes detected to model elements will be saved to the new active topic 302. Previous change items will be organized with respect to a now inactive change topic 304. An inactive change topic includes change topics that may have been detected previously. In some examples, a user may switch an active topic to a different topic for organization. For example, a user may be working on a particular project and wish to save all detected changes to a system under an active topic. When the user begins working on a different project or segment of a project, then a different topic may be selected as an active topic to track changes to that different system separately. An inactive topic may not have detected changes saved to the inactive topic until the inactive topic is again selected as an active topic. In some examples, change items can be moved between topics. For example, a user may have forgotten to switch active topics before beginning work on a new series of changes to a system model. In some embodiments, change items stored in an inactive topic can be moved to any suitable change topic.

In implementations, the change items 306, 308 can be hyperlinks representing individual detected changes in model elements. For example, each change item 306, 308 can reference a model element that was added or modified, or a model element that includes an element that was deleted. The change items 306, 308 can be tagged as main changes 306 or derived changes 308 based on their relation to other change items. In some examples, main changes 306 can represent detected changes that have been determined to cause one or more derived changes 308. For example, one or more derived changes 308 can be associated with a main change 306 and be tagged with a main change reference 316 referencing the associated main change 306. Both change items 306, 308 can include time stamps 312 to specify a date and time of creation and/or last modification as a tagged value. Additionally, both change items 306, 308 can include a modification status tag 314 to specify a modification status as a tagged value. For example, a modification status tagged value can indicate "removed," "added," or "modified."

In some examples, the change items 306, 308 can be displayed in a table. For example, derived changes 308 can be grouped under their associated main changes 306 for ease of analysis. In some examples, the modification status tagged values for each change item can be visualized through color. For example, the "removed" tagged value can be displayed as a first color, the "added" tagged value can be displayed as a second color, and the "modified" tagged value can be displayed as a third color. In some examples, one or more change items can be selected and tagged as "hidden." Change items tagged as hidden can be kept from view in the table.

It is to be understood that the block diagram of FIG. 3 is not intended to indicate that the example change log 300 is to include all of the components shown in FIG. 3. Rather, the example change log 300 can include fewer or additional components not illustrated in FIG. 3 (e.g., additional change topics, additional change items, additional tags, etc.).

Figure 4:
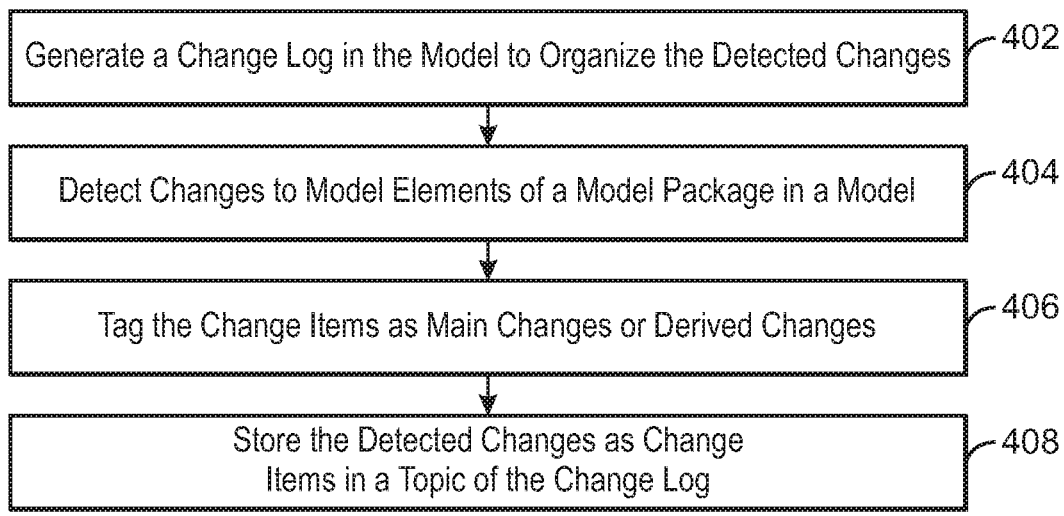
FIG. 4 is a process flow diagram of an example method that can track changes to model elements.

FIG. 4 is a process flow diagram of an example method that can track changes to model elements. The method 400 can be implemented with any suitable computing device, such as the computing device 100 of FIG. 1 and is described with reference to example application 200 of FIG. 2 and the example change log 300 of FIG. 3.

At block 402, the modeling module 124 generates a change log in the model to organize the detected changes. For example, the change log 300 can be a model package similar to the model package 206, but stores change items rather than model elements. In some examples, the change log can be stored as a container on a storage device 200. Unlike a model package 206, the change log package 204 may not be monitored by the monitor module 126. For example, a model package 206 can include model elements to be tracked, while the change log package 204 contains change items corresponding to detected changes in the model elements. Therefore, changes to the change log 204 may not be tracked for changes. In some examples, a change log package 204 can be generated with a default first active topic when a user turns the track changes module on. In some examples, the modeling module 124 can receive a name of the topic and a description of the topic from the user and writes it to the change log.

At block 404, the track changes application 230 detects changes to model elements 216, 218, 220 of a model package 206 in a model 202. In some examples, a monitor module 126 may monitor one or more model packages 206 for changes to the model elements therein. The monitor module 126 can send changes to the track changes application 230 for further processing. A change may include a modification to a model element, a deletion of a model element, or an addition of a model element, among others. For example, a user may make one or more changes to the tracked model and these changes will be detected by the track changes application 230 as they occur.

At block 406, the tracking changes application 230 tags the change items as main changes 306 or derived changes 308 based on one or more detected changes. In some examples, a derived change 308 is a representation of a change that has been determined to be a result of a main change 306. For example, a detected change to a model element may have occurred before and/or cause changes to one or more other model elements. The first detected change can be tagged as a main change 306 and the subsequent/caused changes can be tagged as derived changes 308. Each derived change 308 can include a main change reference 316 to the main change 306 that derived change 308 is associated with.

At block 408, the track changes application 230 stores detected changes as change items 306, 308 of a topic 302 in the change log 300. In some examples, each change item 306, 308 can have a time stamp 312 included with a date and time as a tagged value. Each change item may also store any additional suitable information such as the user name 310 of the user who changed a model element, a schematic view in which the model element 216, 218, 220 was changed, a reference to the model element it relates to, etc. In some examples, a user can add description to the change items 306, 308. In some examples, a user can create a new active change topic 302 and any detected changes to the model elements 216, 218, 220 after that time will be stored in the new active change topic 302. In some examples, a user can move change items 306, 308 from one topic 302 to another topic 304. For example, a user may have forgotten to change the active topic 302 after switching between different parts of a project and making changes to different model elements. The track changes application 230 can receive a request to move one a change item 306, 308 from one change topic 302 to another change topic 304 and move the selected change item 306, 308 accordingly.

In some examples, the change items 306, 308 can be displayed in a table with derived changes 308 listed under the associated main changes 306. For example, each main change 306 may have one or more associated derived changes 308 listed below it in a track changes user interface. In some examples, when the model is saved, the change log is saved with it, along with the topics and change items and associated information.

The process flow diagram of FIG. 4 is not intended to indicate that the operations of the method 400 are to be executed in any particular order, or that all of the operations of the method 400 are to be included in every case. Additionally, the method 400 can include any suitable number of additional operations. For example, the change items can be organized in any additional suitable manner, including the use of color coding to indicate types of changes. In some embodiments, the method 400 can include modifying a visualization of a schematic or view of a model based on the change log. For example, the method 400 may include modifying an electrical schematic or any other suitable schematic based on a detected change to a model element in another schematic such as a mechanical schematic, among others.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
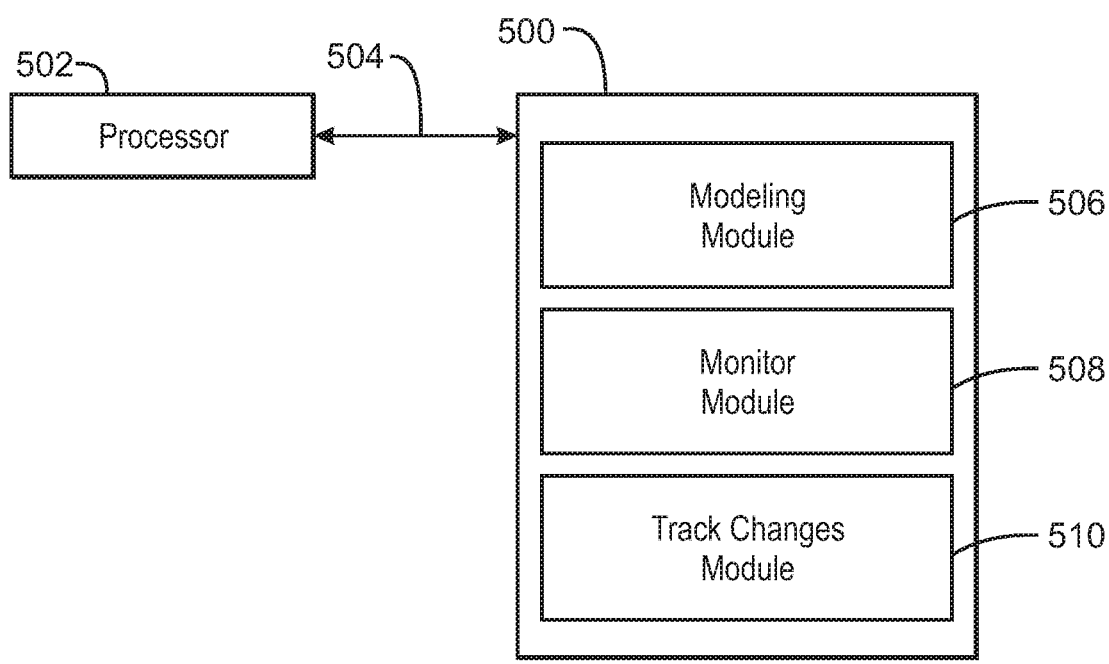
FIG. 5 is an example tangible, non-transitory computer-readable medium that can track changes to model elements.

Referring now to FIG. 5, a block diagram is depicted of an example tangible, non-transitory computer-readable medium 500 that can track changes to model elements. The tangible, non-transitory, computer-readable medium 500 may be accessed by a processor 502 over a computer interconnect 504. Furthermore, the tangible, non-transitory, computer-readable medium 500 may include code to direct the processor 502 to perform the operations of the current method.

The various software components discussed herein may be stored on the tangible, non-transitory, computer-readable medium 500, as indicated in FIG. 5. For example, a modeling module 506 can generate a change log in the model to organize a detected change to the model element. In some embodiments, a monitor module 508 can include instructions to monitor a model element of a model package in a model. The track changes module 510 can include instructions to detect a change to the model element of the model package. The track changes module 510 can include instructions to generate a change item in the change log corresponding to the detected change.

In some examples, the track changes module 510 can include code to insert change items into an active change topic. For example, an active change topic can include change items corresponding to detected changes to model elements made after the active change topic was generated or selected. In some examples, a change item includes a time stamp and a modification status tag. For example, the time stamp can include tagged values corresponding to a date and time that the change item was modified, created, or deleted. In some examples, a change item can include a main change reference tag if the detected change is a derived change. For example, the tagged value of the main change reference tag can be the main change that the derived change is associated with. In some examples, a topic can include a user name tag and a time stamp. For example, the user name tag can have a tagged value corresponding to the name of a user last modifying a topic. The time stamp can also have a tagged value corresponding to the last date and time that the user last modified the topic. In some examples, the modeling language comprises a Unified Modeling Language™ (UML®). It is to be understood that any number of additional software components not shown in FIG. 5 may be included within the tangible, non-transitory, computer-readable medium 500, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor configured to:
   generate a track changes profile defining stereotypes for inserting a detected change into a change log, the stereotypes comprising a change item stereotype, a change topic stereotype, and a change log stereotype, wherein the stereotype is a modelling language extension mechanism configured to extend modelling language vocabulary to create new model elements derived from existing model elements;
   monitor a model element of a model package in a model comprising a modeling language model;
   generate the change log in the model, the change log defined by the track changes profile and configured to store changes to the model element;
   detect a change to the model element;
   tag the detected change as a main change or a derived change based on previously detected changes, wherein the tag is a modelling language extension mechanism that allows at least one property to be specified in connection with the model element; and
   store the detected change as a main change or a derived change in a topic of the change log.

2. The system of claim 1, the change item stereotype comprising a hyperlink representing the detected change in the model, the hyperlink to reference the model element that was added or modified, or the model element that includes an element that was deleted.

3. The system of claim 1, wherein the change topic stereotype defines a change topic package including change items.

4. The system of claim 1, wherein the change log stereotype defines a change log package including change topics.

5. The system of claim 4, the change log stereotype further comprising an active topic tag that is to indicate an active topic into which change items are stored.

6. The system of claim 1, wherein the processor is configured to generate a table for displaying the change log in the model.

7. A computer program product for tracking changes to model elements, the computer program product comprising a computer-readable storage medium having code embodied therewith, wherein the computer readable storage medium is not a transitory signal per se, the program code executable by a processor to cause the processor to:
   generate a track changes profile defining stereotypes for inserting a detected change into a change log, the stereotypes comprising a change item stereotype, a change topic stereotype, and a change log stereotype, wherein the stereotype is a modelling language extension mechanism configured to extend modelling language vocabulary to create new model elements derived from existing model elements;
   monitor, by the processor, a model element of a model package in a model comprising a modeling language model;
   generate, by the processor, the change log in the model, the change log defined by the track changes profile and configured to store changes to the model element;
   detect, by the processor, a change to the model element of the model package;
   tag, by the processor, the detected change as a main change or a derived change based on previously detected changes, wherein the tag is a modelling language extension mechanism that allows at least one property to be specified in connection with the model element; and
   store, by the processor, the detected change as a main change or a derived change in a topic of the change log.

8. The computer program product of claim 7, wherein the topic of the change log is an active change topic.

9. The computer program product of claim 8, wherein the active change topic comprises a user name tag and a time stamp.

10. The computer program product of claim 7, wherein the change item comprises a time stamp and a modification status tag.

11. The computer program product of claim 10, wherein the change item further comprises a main change reference tag if the detected change is a derived change.

12. A method, comprising:
    generating a track changes profile defining stereotypes for inserting a detected change into a change log, the stereotypes comprising a change item stereotype, a change topic stereotype, and a change log stereotype, wherein the stereotype is a modelling language extension mechanism configured to extend modelling language vocabulary to create new model elements derived from existing model elements;
    monitoring, using at least one processor, a model element of a model package in a model comprising a modeling language model;
    generating, using the at least one processor, the change log in the model, the change log defined by the track changes profile and configured to store changes to the model element;
    detecting, using the at least one processor, a change to the model element;
    tagging, using the at least one processor, the detected change as a main change or a derived change based on previously detected changes, wherein the tagging is a modelling language extension mechanism that allows at least one property to be specified in connection with the model element; and
    storing, using the at least one processor, the detected change as a main change or a derived change in a topic of the change log.

13. The method of claim 12, wherein the monitoring the model element of the model package of the model comprises monitoring the model element using a plugin monitor module and sending the detected change in the model to a track changes module.

14. The method of claim 12, wherein the change item includes a main change reference tag if the detected change is a derived change.

15. The method of claim 12, further comprising storing the detected change by inserting the change item into an active topic in the change log.

16. The method of claim 15, further comprising receiving an adjustment to the tagged main change or derived change.

17. The method of claim 12, further comprising receiving a request to hide a tracked change and displaying the tracked change in a table as hidden.

18. The method of claim 12, further comprising loading a last active topic when the model is reopened and track changes are on.

* * * * *